United States Patent
Kostroun et al.

[15] 3,645,479
[45] Feb. 29, 1972

[54] AIRCRAFT TIRE EXPLOSION PREVENTION SYSTEM

[72] Inventors: Vaclav Kostroun; Henry H. W. Quenzler, both of Seattle, Wash.

[73] Assignee: The Boeing Company, Seattle, Wash.

[22] Filed: Mar. 16, 1970

[21] Appl. No.: 19,603

[52] U.S. Cl. ..........................................244/103 R, 137/72
[51] Int. Cl. ............................................................B64c 25/36
[58] Field of Search ...............244/102, 103, 103 R, 111; 152/415, 416, 427; 116/34; 137/72, 73; 301/5 R; 340/58, 20, 22; 73/509, 510

[56] References Cited

UNITED STATES PATENTS

| | | | |
|---|---|---|---|
| 2,927,302 | 3/1960 | Steigerwald | 244/111 X |
| 3,254,666 | 6/1966 | Baker, Jr. | 152/415 X |
| 3,374,460 | 3/1968 | Massoubre | 340/58 |

FOREIGN PATENTS OR APPLICATIONS

| | | | |
|---|---|---|---|
| 932,404 | 3/1948 | France | 244/102 |
| 993,992 | 11/1951 | France | 244/102 |
| 705,136 | 4/1941 | Germany | 244/103 |

Primary Examiner—Milton Buchler
Assistant Examiner—Paul E. Sauberer
Attorney—Glenn Orlob and Nicolaas DeVogel

[57] ABSTRACT

The rotation of each aircraft tire is monitored and compared and when a discrepancy in these rotations shows an off-synchronized tire rotation, a warning device is activated. In addition, a temperature-sensing valve on each aircraft tire will release the air pressure in the tire and activate the warning device when a predetermined temperature level is sensed and thereafter stop the air release when a predetermined lower air pressure is reached.

6 Claims, 7 Drawing Figures

INVENTORS.
VACLAV KOSTROUN
HENRY H. W. QUENZLER
BY
AGENT

INVENTORS.
VACLAV KOSTROUN
HENRY H. W. QUENZLER
BY

AGENT

Patented Feb. 29, 1972

INVENTORS.
VACLAV KOSTROUN
HENRY H. W. QUENZLER
BY:

*Nicolaas O.W.ge*
AGENT 3,645,479

AIRCRAFT TIRE EXPLOSION PREVENTION SYSTEM

BACKGROUND OF THE INVENTION

1. Field of the Invention

This present invention relates to a safety method and apparatus for preventing tire explosion in aircraft and in particular to tire rotation and temperature-sensing means for automatically regulating tire pressure and activating a warning device.

2. Description of the Prior Art

An aircraft tire explosion inside the wheel well is a very rare but extremely dangerous incident, as has been evidenced by the loss of an airplane and extensive damage to several other airplanes. A tire blowout is primarily caused by excessive tire wear and tire and wheel overheating. Aircraft tires are provided with thermal fuse devices which will open upon overheating and deflate the tire completely so that the airplane will be saved from the explosion effects of the tire, but the pilot is then faced with another problem—that of landing the aircraft with a deflated tire. Various patents which are directed to thermal fuse devices used to release pressure in airplane tires have issued and are recorded in the U.S. Patent Office under:

U.S. Pat. No. 3,157,219 Dinin et al.
U.S. Pat. No. 3,200,987 Horner et al.
U.S. Pat. No. 3,269,402 Horner et al.

However, a pressure relief valve for aircraft tires which releases only part of the pressure buildup and thus does not deflate the tire completely so that a decent landing can still be accomplished appears to be nonexistent.

In general, the presently used passive explosion protection by guards and shields in the aircraft wheel well for preventing harm to the vital landing gear control mechanism is heavy and futile as well as a nuisance factor in servicing, maintenance, etc.

Upon a thorough study of the prior art tire blowout prevention devices and upon examination of the past accidents, the following were noted:

1. Tire explosion primarily results from fast local wearthrough of the rubber due to a temporarily or partly locked wheel. It will probably never be possible to prevent this wear unless an efficient way to prevent wheel locking can be invented, which would involve new tire design and brake mechanisms.

2. The pilot is never aware of wheel speed differences.

3. Blowout occurs in most cases upon retraction of the landing gear into the wheel well due to loss of the cooling airstream against the tires outside the wheel well.

4. In flight the pilot is not aware of the existence of an overheated tire, and by the conventionally used self-deflating fuses is not aware of a deflated tire.

SUMMARY OF THE INVENTION

The present invention relates to a system designed to prevent tire blowouts on an airplane, especially when the wheels are retracted up in the wheel well. The system includes a sensor mechanism to sense any difference in the speed of the wheels on takeoff and operates a warning device in the event of a speed difference so that the pilot will delay retraction of the landing gear for sufficient cooling. Furthermore, the system includes an automatic temperature-sensing device for releasing partial tire pressure when overheating occurs and activates the warning device so that necessary precautions for landing and immediate tire correction or repair can be made thereafter.

As mentioned before, overheating of a tire normally occurs during takeoff due to seizing of the brake mechanism or due to other rotational resistance. The scuffing of the tire will produce an increase in tire temperature and local weakening of the tire structure. Since the explosion factor has a direct relationship with temperature increase and tire air pressure, a certain increase in temperature will cause explosion of a tire at a constant air pressure so that release of air pressure will provide for a larger safety margin.

Thus, when an increase in tire temperature occurs, either air pressure release or cooling of the tire may prevent explosion.

When overheating occurs because of rotation resistance of one tire during takeoff of the aircraft, the specific tire will be heated up, but at the same time will be cooled by the airstream during initial climb. If the pilot knows that the tire is overheated, he will not retract the landing gear, but keep the tires out of the wheel well for a while because a sudden loss of the cooling upon retraction of the landing gear may increase the tire temperature and consequently the pressure to a dangerous level.

Assuming that an airplane cannot afford the drag of the landing gear after takeoff because a steep climb is necessary or a heavy load and adjacent airfield obstacles demand a steep climb, then the hot tire will be retracted into the wheel well. An automatic pressure release will then bring the tire into a safer condition with respect to the explosion factor.

Thus, it can be seen that the present invention provides for various advantages over the prior art, such as:

a. It increases the safety of the airplane and the safety of the landing and takeoff operation by keeping the explosion danger outside the aircraft instead of having the consequences of an explosion inside the wheel well.
b. It reduces weight by approximately 50 lbs.
c. It reduces the airplane production cost by $2,000 per airplane.
d. It improves the maintainability by better access to maintenance items inside the wheel well.
e. It reduces cost of tire expenditures by having less tire and wheel loss and safer operations.
f. The explosion prevention valve is quick and fully exchangeable, and interchangeable for retrofit.
g. It increases the safety margin with regard to the critical explosion factor by about 100 percent.

It is therefore an object of the present invention to provide for a tire explosion prevention system by first sensing the cause of overheating so that sufficient cooling can be applied and, secondly, by sensing the overheating and reducing the explosion level through partial automatic tire air pressure release while activating a warning means when the cause and/or the overheating is sensed.

It is another object of the present invention to provide for a tire explosion prevention system by monitoring and comparing rotations of the aircraft tires for a nonsynchronized rotation and by controlling tire temperature and tire air pressure at predetermined levels, while activating a warning means at each off-predetermined level.

It is another object of the present invention to provide for a tire explosion prevention system using tire rotation differential sensing means subjective to a discriminator circuitry receiving inputs from a turn indicator and landing gear squatting means for avoiding nuisance signals.

IN THE FIGURES

Figure 1:
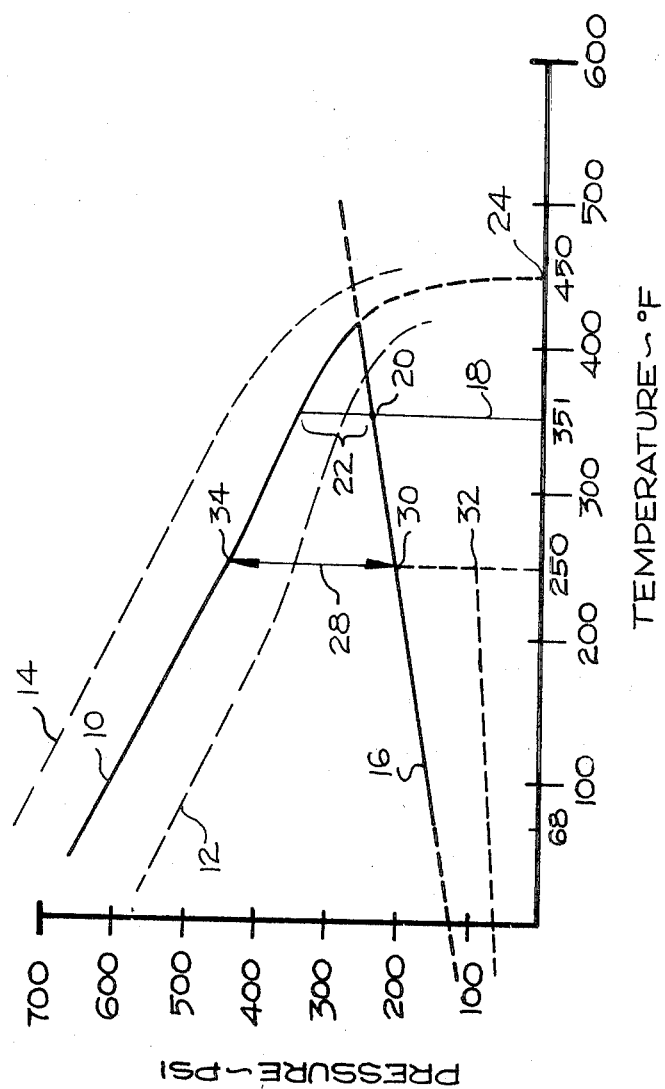
FIG. 1 is a line graph showing tire pressure vs. the temperature for two systems, the conventional and the present invention.

As stated, the present invention is an improvement over the prior art which is clearly shown in the line graph of FIG. 1. The pressure carrying capability of an average tire in p.s.i. of air pressure vs. temperature is plotted by the curve 10. Because the pressure-carrying capability for an older tire and newer tire has slightly different limits, the dashed curves 12 and 14 represent an acceptable old tire and a new tire, respectively.

The internal air pressure charge based on 150 p.s.i.g. at 68° F. is represented by line 16. The tire explosion point 18 appears where the curve 10 intersects with line 16.

As explained hereinbefore, the conventional system uses tire fuse deflation plugs; these plugs are set on 351° F. As shown in FIG. 1 the dashed-dot line 18 represents at intersection 20 the fuse meltout period. The length 22 of the line 18 indicates the safety margin for an average tire. One should observe that the safety margin for an older tire is much less. The melt point of the cord fiber of the tire is indicated by reference number 24 at 450° F.

The present invention has a larger safety margin 28 because the meltout fuse operates on 250° F. or in other words, 101° earlier than the conventional safety fuse valve. Thus, in case of a temperature higher than 250° F., the thermopressure-sensitive valve being part of the present invention, will release the internal air pressure which at that point 30 is about 200 p.s.i. and stop the release of air at a lower internal pressure of 80 p.s.i. at point 32.

It will be obvious that the present disclosed active system increases the safety margin with regard to critical explosion pressure and temperature by over 100 percent as will be clearly indicated by comparing the length of the line between point 32 and 34 to the length of line 22.

Figure 2:
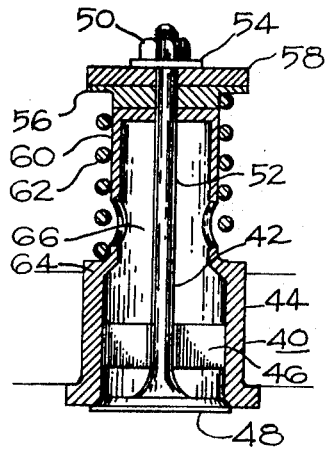
FIG. 2 is a sectional view of an automatic temperature and pressure sensible valve in closed position where the temperature and pressure are within acceptable limits.
Figure 3:
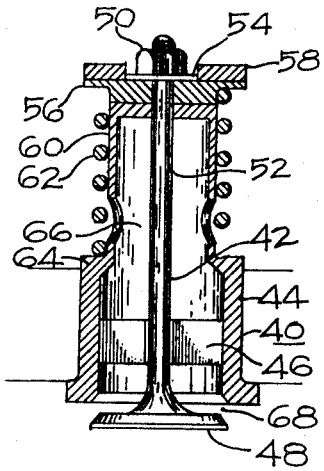
FIG. 3 shows the same valve as in FIG. 2, but in opened position due to tire overheating.
Figure 4:
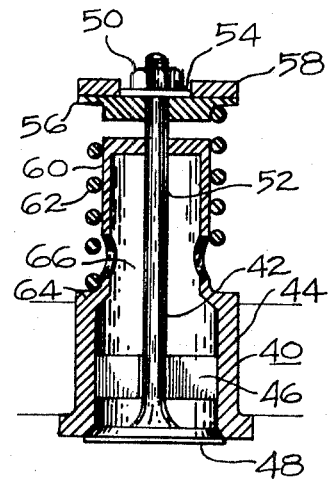
FIG. 4 shows the same valve as in FIG. 3 at a later time period wherein the valve is in a closed position after a certain pressure level was sensed.

As mentioned before, a temperature-pressure-sensitive valve plays an active part in the system and a preferred configuration of such a valve 40 is illustrated in its various modes of operation in FIGS. 2, 3 and 4.

In FIG. 2 the valve 40 comprises a piston 42 and a housing 44. The piston 42 is kept centered by a plurality of guide vanes 46 which are mounted within the housing 44. The piston head valve 48 is in closed position by being screwed tight by the nut 50 on the valve stem 52 which secures the washer 54 to the spring retainer 56 adjacent a layer of temperature-sensitive material 58 and the dead-end housing portion 60 of the housing 44. A spring 62 which is biased to overcome an internal tire pressure of 80 p.s.i. is located about the housing 44 between the spring retainer 56 and a shoulder 64 on the external housing 44. Assuming that the temperature sensible material 58 will melt when a temperature of 250° F. is reached, then the valve 40 will open as shown in FIG. 3. The internal pressure has via the orifices 66 in the housing 44 pushed the valve open by pulling the washer 54 through the softened material 58 and air will escape via the ring-shaped valve opening 68 that has been made. The internal tire air pressure will quickly reduce to a lower value and eventually reach the 80 p.s.i. predetermined spring-biased valve so that as shown in FIG. 4, the spring 62 force will be stronger in comparison and raise the spring retainer 56 away from the dead-end housing portion 60 and thereby pull the valve head 48 against the housing 44 so that the ring-shaped opening 68 is closed.

The tire will thus have a rather low internal pressure, but landing with a soft tire is still preferred and safer than landing with a totally deflated tire.

Figure 5:
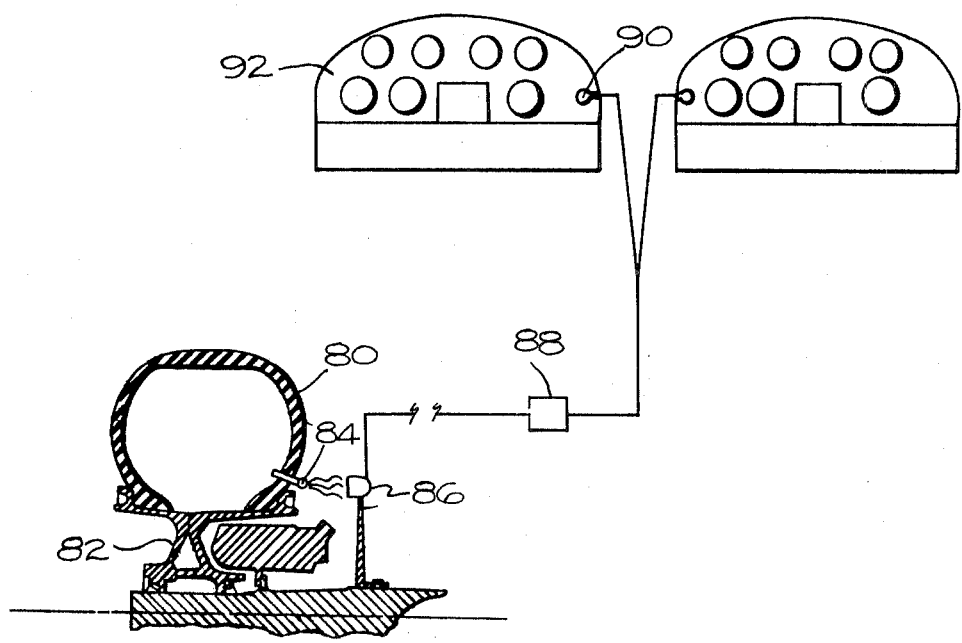
FIG. 5 shows diagrammatically a partial tire deflation indication warning system for aircraft.

A cross section of a tire 80 having a valve 40 is illustrated in FIG. 5. The tire 80 is mounted on a wheel and rim construction 82. The valve 40 is further provided with an ultrasonic whistle 84 having an operating frequency of between 22,000 and 26,000 c.p.s.

The ultrasonic frequency will be picked up by a specially tuned microphone 86 and is converted into an electronic signal by electronic circuit means 88 which will operate a warning indicating device 90. The device 90 is preferably connected to the instrument panel 92 of an aircraft, and provides a visual or audible signal or both, whichever is desired. The microphone is attached to the moving landing gear strut (not shown) of an aircraft adjacent the whistle 84 output.

Figure 6:
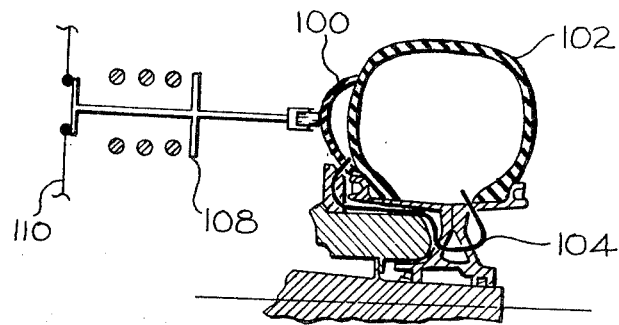
FIG. 6 shows diagrammatically another partial tire deflation indication warning system for aircraft.

FIG. 6 illustrates a different system for providing an alarm signal to the aircraft instrument panel 92.

The operation of this system requires an inflatable ring cemented to the tire 102 and conduit 104 connection between the valve 40 output and the inflatable ring 100 input. During operation when it is assumed that the tire 102 reaches a too high temperature and the valve 40 releases air, the air will via the conduit 104 enter the inflatable ring 100 which upon inflation will throw a spring-biased switch 108 in a closed position so that a signal via electronic circuit means 110 is initiated for activating the warning indicator device 90.

It should be realized, however, that there are no mechanical moving parts or electrical connections between the fixed and moving parts in the first indicating warning system explained in conjunction with FIG. 5 and, therefore, the subsystem is rugged, simple and inexpensive and preferred over the system shown in FIG. 6.

As mentioned in the summary of the invention, the cause of an overheated and abraded tire is normally a binding or seizing of brakes or through other wheel rotation preventing causes.

It will be of great significance to safety that the pilot knows when one of the aircraft tires is not rotating properly and undergoes a dangerous temperature increase. In such case preventative and efficient corrective action can be very valuable because by first cooling the tire, by delaying retraction into the wheel well, may present explosion in the wheel well. This type of explosion is normally fatal for the airplane. In order to determine the difference of rotation a means for monitoring the rotation of a plurality of aircraft wheels or tires and a means for sensing the difference of rotation has to be implemented. This rotation monitor and differential rotation sensor which is connected to the instrument panel 90 for activating the warning indicator means 92, is shown in FIG 7.

As shown, each wheel 120 is provided with a rotation sensor 122, which may be accomplished mechanically or by magnetic induction (tachometer) or in any other conventional manner. The output of each rotational sensor is then connected to a voltmeter or electronic bridge 124 which will compare the inputs for synchronization, having a slight tolerance percentage to compensate for miscellaneous small errors due to ground condition for each tire, slightly curved takeoff, etc.

Figure 7:
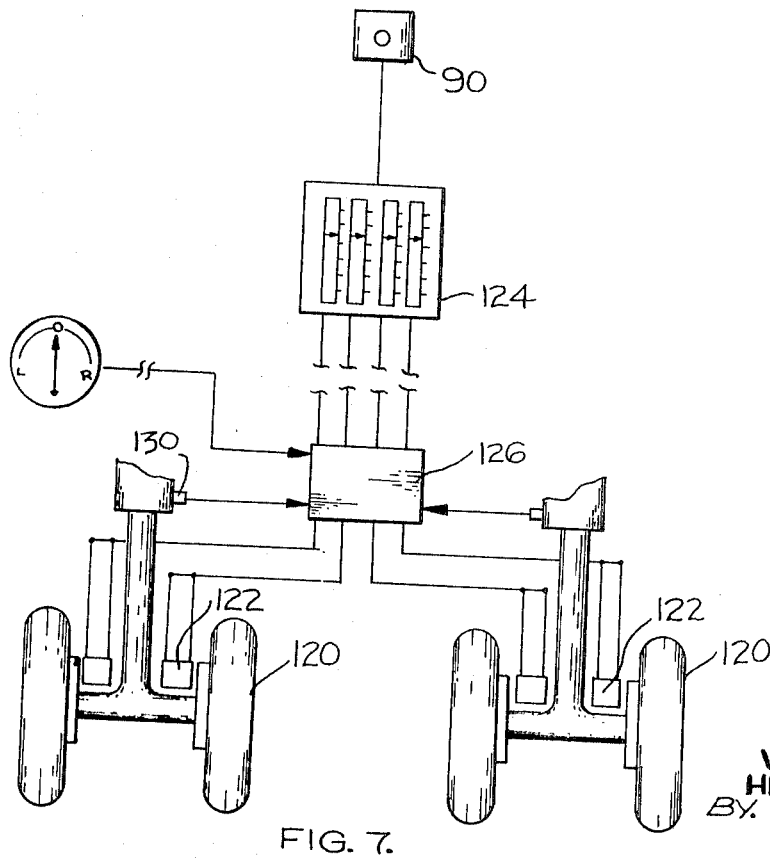
FIG. 7 shows a wheel binding detector or tire rotation differential sensing system.

It is preferred and shown in FIG. 7 that each tachometer is connected to a simple indicating voltmeter 124 having a narrow cylindrical segment dial. As long as the voltages are equal the wheels rotate at the same speed. Any deviation indicates that one or more wheels drag or lock. Here again correction for small differences due to tire wear or deflections, etc., which are insignificant can be incorporated. A differential signal will thus activate the warning indicator 90.

During normal taxi maneuvers an aircraft may make various turns which turns do produce a large speed or rotation difference between an inner wheel and outer wheel taken in respect to the turn point. In order to avoid a nuisance warning signal the system is connected to a discriminator circuit 126. As illustrated in FIG. 7 the discriminator circuit 126 is hooked up with a turn indicator instrument 128, which in turn will interrupt the differential signal from activating the warning device 90.

Furthermore, during takeoff the rotation monitoring system is switched off immediately by the squatting switch 130. A squatting switch is an existent component which senses or feels if the landing gear strut is loaded or supporting the aircraft. Thus, this squatting switch 130 hookup illustrates the problem of uneven spinning wheels as soon as the aircraft is airborne, so that a nuisance signal is avoided.

In general the system illustrated in FIG. 7 will warn the pilot that one or more wheels are not properly rotating and are running hot and if the voltmeter 124 is used on the instrument panel 92, as an indicator means, it will tell which tire is turning too slowly.

When looking at the performance of this differential rotational wheel-sensing system, it becomes clear that, indirectly a tire wear measurement system is introduced.

It also appears that this rotation tire wear measuring system can be implemented in transporting vehicles such as trailers, trucks, etc.

Having thus explained and described the present invention with the assistance of the line graph shown in FIG. 1 and by using diagrammatically illustrated components, it should be realized that the value of pressure, temperature, etc., and the mechanical diagrams and symbols can be varied and rearranged without varying the scope and spirit of this invention.

We claim:

1. An aircraft tire explosion prevention system comprising:
   a. a tachometer mounted at each aircraft wheel for sensing rotation speed,
   b. a tire rotation indicating device electrically connected to said tachometers for indicating rotation speed value for each tire simultaneously,
   c. an electronic bridge circuit incorporated in said indicating device for sensing an eventual substantially slower rotation as a differential signal,
   d. a temperature and pressure sensing valve for each aircraft tire having
      a valve housing,
      a piston,
      a locking member material for securing said piston in said valve housing so that said valve is closed, said locking member material having a calculated temperature level rigidity losing quality so that said valve becomes opened when said calculated temperature destructs said locking member material and,
      a spring connected to said piston, biased at a predetermined force for closing said valve,
   e. an ultrasonic whistle for producing a supersonic frequency signal mounted on said valve for activation upon opening of said valve by air release,
   f. an ultrasonic frequency microphone installed adjacent said ultrasonic whistle for receiving said supersonic signal, and
   g. a warning indicator device electrically connected to said microphone and to said bridge circuit for activation of said warning indicator by said differential signal and by said ultrasonic frequency signal respectively.

2. A tire explosion preventing system for aircraft as claimed in claim 1 wherein said locking member material for closing said valve is made from a eutectic alloy.

3. A tire explosion prewarning and preventing system for a multiple wheel vehicle comprising: wheel rotation sensing means at each wheel for producing an electrical signal proportional to the rotation speed of each wheel; a monitor for receiving and comparing each of said signals to detect whether one of said signals displays a a substantial deviation from the others and for producing a differential signal indicating that the rotation speed of one of said wheels is deviating substantially from that of the others; valve means for releasing air from each of said tires at a predetermined tire temperature, and for stopping the release of air at a predetermined air pressure level; air release sensing means mounted on said valve means comprising means for producing an air release signal upon release of air pressure; warning signal means responsive to either of said differential signal or said air release signal to generate a signal warning the operator of the vehicle of an abnormal tire condition.

4. The system of claim 3 wherein said air release sensing means comprises an ultrasonic whistle having an operating frequency of between 22,000 and 26,000 c.p.s. and a specially tuned microphone.

5. The system of claim 3 including a turn indicator instrument and a discriminator means operably connected to said monitor for preventing actuation of said warning signal means by said differential signal when said vehicle is being turned.

6. The system of claim 5 wherein said vehicle is an aircraft equipped with multiple wheel landing gear struts and said discriminator means further includes a squatting switch means located on each strut for preventing actuation of said warning signal means when said landing gear is in an extended position after takeoff.

* * * * *